No. 862,658. PATENTED AUG. 6, 1907.
W. N. REED.
CYCAS LEAF HOLDER.
APPLICATION FILED JAN. 15, 1907.
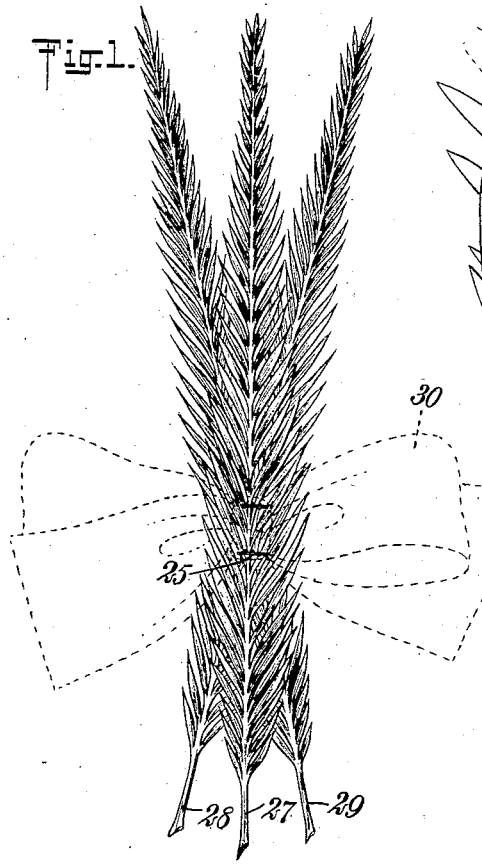
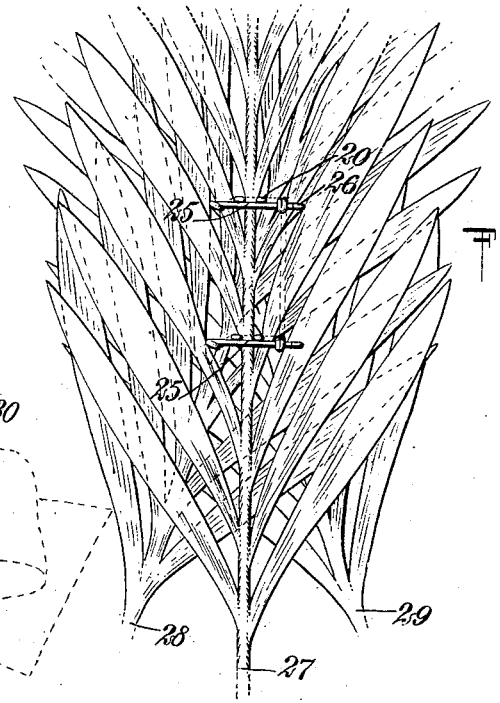
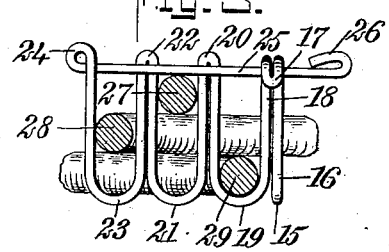
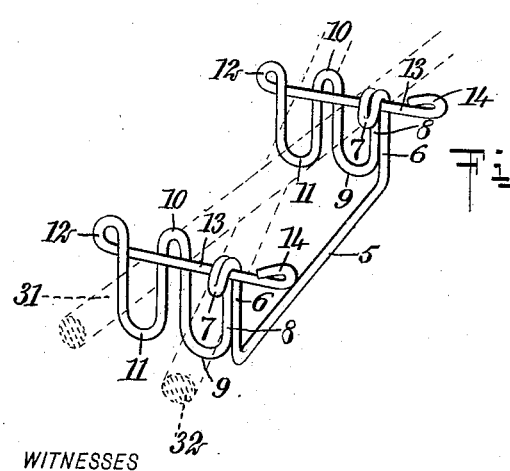
WITNESSES
INVENTOR
William N. Reed
BY
ATTORNEYS

UNITED STATES PATENT OFFICE.

WILLIAM NICHOLAS REED, OF NEW YORK, N. Y.

CYCAS-LEAF HOLDER.

No. 862,658.          Specification of Letters Patent.          Patented Aug. 6, 1907.

Application filed January 15, 1907. Serial No. 352,392.

*To all whom it may concern:*

Be it known that I, WILLIAM NICHOLAS REED, a citizen of the United States, and a resident of the city of New York, borough of Manhattan, in the county and State of New York, have invented a new and Improved Cycas-Leaf Holder, of which the following is a full, clear, and exact description.

My invention relates to means for holding leaves, flowers and the like, and more particularly for holding cycas leaves in definite position suitable for ornamentation.

My invention admits of general use, but is used especially for the decoration and adornment of caskets, coffins, graves, and the like.

Reference is to be had to the accompanying drawings forming a part of this specification, in which similar characters of reference indicate corresponding parts in all the figures.

Figure 1 is a front elevation showing three cycas leaves crossed and held together by means of my device; Fig. 2 is a fragmentary enlarged view otherwise similar to Fig. 1, the ribbon being removed and showing the manner in which the leaf stems are crossed and held firmly in definite relation; Fig. 3 is an enlarged cross section through the three cycas leaves crossed, shown in Fig. 1, the leaf holder of my invention being here seen in elevation and used for the purpose of clasping the three leaves together as crossed; Fig. 4 is a perspective showing the form of my invention adapted to hold two of the cycas leaves crossed, as indicated by dotted lines.

The cycas leaf holder is made entirely from a single piece of spring wire. At each end of the section 5, the wire is bent upward at 6 and backward upon itself at 8, the loop thus formed being bent over so as to form a hook 7, the wire being now bent at 9, 10, 11, 12 in serpentine form and provided with straight portions 13 terminating in loops 14. The straight portions 13 serve as latches, the loops 14 as handles, and the loops 12 as spring hinges. In order to release these latches 13 from their hooks 7, the operator grasps the loop 14, presses it downwardly and out under the hook 7, whereupon it will spring obliquely upward. In order to insert the leaves, both latches 13 are released from the hooks 7.

The form shown in Fig. 4 is employed where only two cycas leaves are to be secured together. If there are three leaves to be secured as indicated in Figs. 1 and 2, the form shown in Fig. 3 is preferable. In this form there is a straight connecting portion 15, the wire being bent upwardly at 16 and bent back upon itself at 18, and bent over so as to form a hook 17. The wire is again bent at 19, 20, 21, 22, 23, 24 in serpentine form, the bends 19, 21, 23 being larger than the bends 20, 22. The straight portions 25 of the wire are integral with the loops 24 and terminate in loops 26. The construction of the form shown in Fig. 3 differs but little therefore, from that shown in Fig. 4, the distinction being in the number of bends. In the form shown in Fig. 3 the action is practically the same as that in Fig. 4.

In Fig. 3 the stems of the cycas leaves are shown at 27, 28, 29. In Fig. 4 the stems of the leaves are shown in dotted lines at 31, 32.

A ribbon 30 may be tied about the bunch of cycas leaves so as to encircle the device of my invention.

My device is used as follows: In order to secure the leaves by means of the device shown in Fig. 4, the stem 32 is laid obliquely in relation to the position of the device so that the stem rests in the bends 9 and 11. The other leaf is now laid in such position that the stem 31 passes through bends 9, 11; the two stems 31, 32 thus cross each other at a suitable angle. The loops 14 are now grasped by the operator and by their aid the latches 13 are sprung downwardly so as to catch beneath the hooks 7 and thus hold the two leaves firmly, but with the proper degree of resilience. This resilience is necessary, for the reason that the stems have more or less resilience and in becoming slightly wilted they may shrink or change form, so that in order to maintain the pressure upon them necessary to hold them in proper position, the fastening must have a high degree of elasticity.

In order to use the form shown in Fig. 3, the stem 29 is placed obliquely in position, substantially as above described; the stem 28 is next placed across the stem 29 and finally the stem 27 is laid upon the stem 28 in such manner as to coincide with the general direction of the length of the cycas holder, as indicated in Figs. 1 and 2.

The ribbon 30 may be tied into a bow, and is used in connection with either of the two forms above described. The cycas leaf holder affords a good point at which the ribbon may readily be tied without danger of sliding off in either direction. The cycas leaves being secured together, as above described, may be readily handled without danger of being shaken apart or displaced relatively to each other. Should the complete decoration shown in Fig. 1 be rested in such position that one of the stems 10, 11 or 12 happens to support all or an undue portion of the weight, this can have no effect in disturbing the relative positions of the cycas leaves. When the latter are thus put together they remain in the same relation for an indefinite length of time.

Decorations of the kind shown in Fig. 1, considered as complete articles, may be sold by florists in much the same manner as if the leaves and ribbons were sold separately. The decorations thus complete may be laid directly upon coffins, caskets, graves or cemetery lots, and require no fastenings whatever and no further manipulation.

Having thus described my invention I claim as new and desire to secure by Letters Patent:

1. A cycas leaf holder made of a single piece of spring wire provided with a longitudinal portion, a hook portion, separate loops, a spring loop portion, straight portions serving as latches, and loops serving as handles for said latches.

2. A device of the character described, comprising a member provided with substantially U-shaped holding members (9, 10, 11) separated from each other and adapted to receive floral stems crossed, and further comprising latch portions 13, and means for holding said latch portions in predetermined positions relatively to said U-shaped members.

In testimony whereof I have signed my name to this specification in the presence of two subscribing witnesses.

WILLIAM NICHOLAS REED.

Witnesses:
ALEXANDER LEVENE,
FRANK M. HILL.